US009783958B2

(12) United States Patent
Dretzka

(10) Patent No.: US 9,783,958 B2
(45) Date of Patent: Oct. 10, 2017

(54) DRIVE MECHANISM FOR MINING ATTACHMENT

(71) Applicant: Harnischfeger Technologies, Inc., Wilmington, DE (US)

(72) Inventor: Andrew P. Dretzka, New Berlin, WI (US)

(73) Assignee: Harnischfeger Technologies, Inc., Wilmington, DE (US)

(*) Notice: Subject to any disclaimer, the term of this patent is extended or adjusted under 35 U.S.C. 154(b) by 415 days.

(21) Appl. No.: 14/331,348

(22) Filed: Jul. 15, 2014

(65) Prior Publication Data

US 2015/0020636 A1    Jan. 22, 2015

Related U.S. Application Data

(60) Provisional application No. 61/846,786, filed on Jul. 16, 2013.

(51) Int. Cl.

| | |
|---|---|
| *E02F 9/14* | (2006.01) |
| *B25J 18/00* | (2006.01) |
| *E02F 3/30* | (2006.01) |
| *E02F 3/407* | (2006.01) |
| *E02F 3/42* | (2006.01) |
| *E02F 3/46* | (2006.01) |

(52) U.S. Cl.
CPC ............... *E02F 9/14* (2013.01); *B25J 18/00* (2013.01); *E02F 3/302* (2013.01); *E02F 3/304* (2013.01); *E02F 3/4075* (2013.01); *E02F 3/425* (2013.01); *E02F 3/46* (2013.01); *Y10T 74/20305* (2015.01)

(58) Field of Classification Search
CPC ... E02F 9/14; E02F 3/302; E02F 3/304; E02F 3/4075; E02F 3/46; E02F 3/425; B25J 18/00; Y10T 74/20305
See application file for complete search history.

(56) References Cited

U.S. PATENT DOCUMENTS

| | | | |
|---|---|---|---|
| 3,219,213 A | 11/1965 | Learmont | |
| 4,316,697 A * | 2/1982 | Yokoyama | E02F 3/30 414/694 |
| 5,820,074 A | 10/1998 | Trommer et al. | |
| 6,434,862 B1 * | 8/2002 | Hren | E02F 3/304 37/398 |

* cited by examiner

*Primary Examiner* — Scott Lowe
(74) *Attorney, Agent, or Firm* — Michael Best & Friedrich LLP

(57) ABSTRACT

A rope shovel has a boom and a hoist rope. The boom has a first end and a second end. The hoist rope extends over the second end of the boom. A digging assembly for the rope shovel includes a shaft, an elongated member supported for movement relative to the boom, an attachment, and a drive link. The shaft is positioned between the first end and the second end of the boom and transverse to the boom, and the shaft includes at least one pinion gear. The elongated member includes a first end and a second end. The attachment is coupled to the first end of the elongated member and is configured to be coupled to the hoist rope. The drive link includes a rack engaging the pinion gear of the transverse shaft such that rotation of the pinion gear moves the drive link and actuates the attachment.

23 Claims, 10 Drawing Sheets

DRIVE MECHANISM FOR MINING ATTACHMENT

CROSS-REFERENCE TO RELATED APPLICATION

This application claims the benefit of the prior-filed, co-pending U.S. Provisional Patent Application Ser. No. 61/846,786, filed Jul. 16, 2013, the entire contents of which is incorporated herein by reference.

BACKGROUND

The present invention relates to industrial machines and, in particular, to a drive mechanism for an attachment of an earthmoving machine.

Conventional rope shovels include a boom and a handle coupled to the boom for rotational and translational movement. An attachment such as a dipper is coupled to the handle, and is supported by a cable or hoist rope that passes over an end of the boom. The rope is secured to a bail that is pivotably coupled to the dipper. During the hoist phase, the rope is reeled in by a hoist drum, lifting the dipper upwardly through a bank of material and liberating a portion of the material. The orientation of the dipper relative to the handle is generally fixed during a dig cycle and is not controlled independently of the handle and hoist rope.

SUMMARY

In one embodiment, an industrial machine includes a boom having a first end and a second end, an elongated member movably coupled to the boom and including a first end and a second end, an attachment coupled to the first end of the elongated member and including an actuator, a drive link movably coupled to the boom and movable relative to the elongated member, and a fluid actuator including a piston positioned in a cylinder. The fluid actuator includes a first end and a second end coupled to the drive link, and movement of the drive link drives operation of the attachment actuator.

In another embodiment, an industrial machine includes a boom having a first end and a second end, an elongated member movably coupled to the boom and including a first end and a second end, an attachment coupled to the first end of the elongated member, a drive link movably coupled to the boom and movable relative to the elongated member, and a follower link including a first end pivotably coupled to the drive link and a second end coupled to the attachment. Movement of the drive link drives actuation of the attachment.

In yet another embodiment, the invention provides a digging assembly for a rope shovel having a boom and a hoist rope. The boom has a first end and a second end. The hoist rope extends over the second end of the boom. The digging assembly includes a shaft, an elongated member supported for movement relative to the boom, an attachment, and a drive link. The shaft is positioned between the first end and the second end of the boom and transverse to the boom, and the shaft includes at least one pinion gear. The elongated member includes a first end and a second end. The attachment is coupled to the first end of the elongated member and is configured to be coupled to the hoist rope. The drive link includes a rack engaging the pinion gear of the transverse shaft such that rotation of the pinion gear moves the drive link and actuates the attachment.

Other independent aspects of the invention will become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
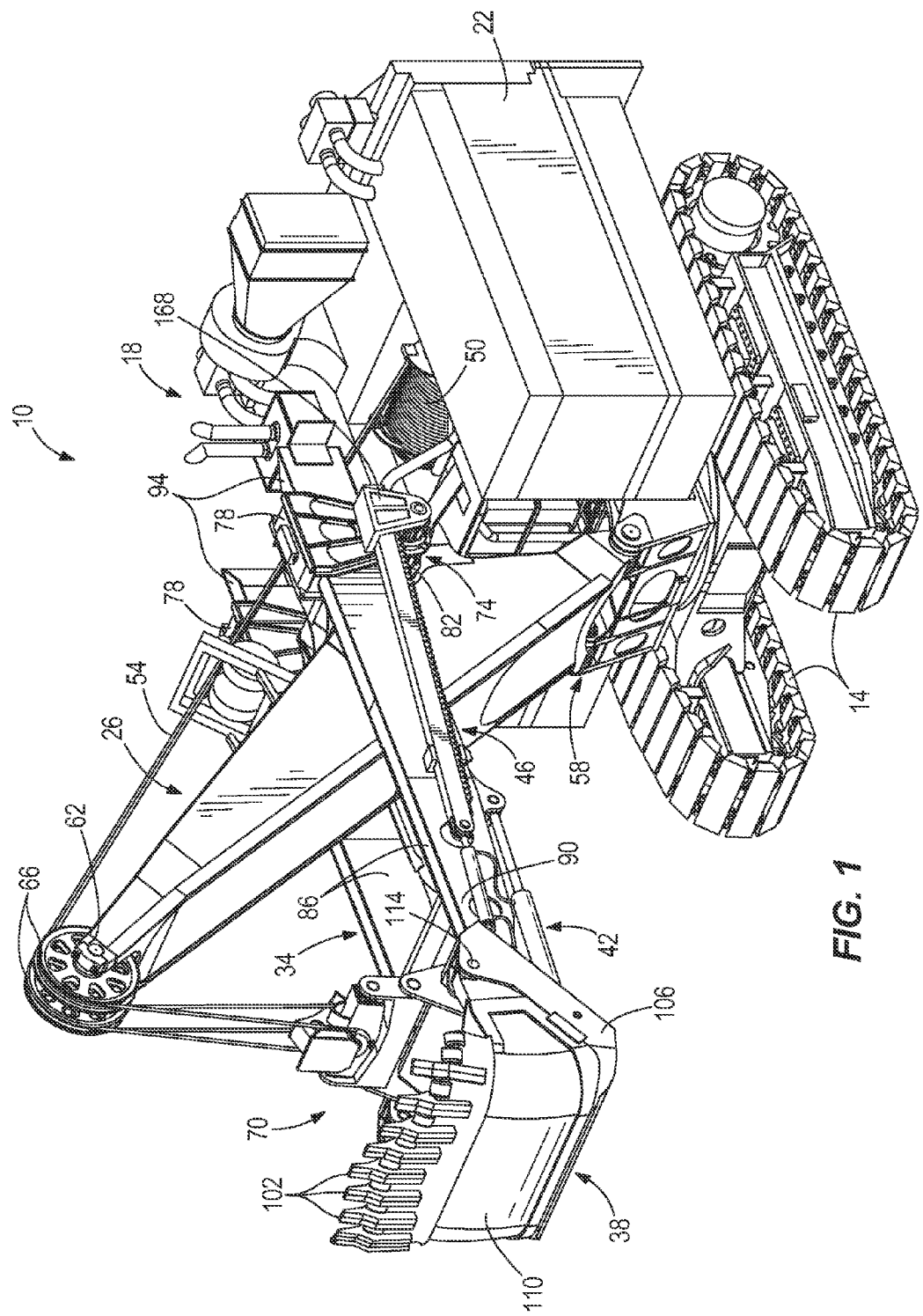
FIG. 1 is a perspective view of a mining shovel.

FIG. 1 illustrates an earthmoving machine, such as a mining shovel 10, supported by tracks 14 on a support surface or ground (not shown). The shovel 10 includes a frame 18 having a base 22 supporting a boom 26, an elongated member or handle 34, an attachment or bucket 38 including pivot actuators 42, and a drive mechanism 46 for actuating the bucket 38. The base 22 includes a rotational structure for rotating about an axis of rotation (not shown) that is generally perpendicular to a plane corresponding to a grade of the support surface. The base 22 also includes a hoist drum 50 for reeling in and paying out cable or ropes 54. Although the drive mechanism 46 is described with respect to the shovel 10, the drive mechanism 46 may be used on other industrial machines, including other mining machines.

The boom 26 includes a first end 58 coupled to the base 22 and a second end 62 opposite the first end 58. In the illustrated embodiment, the first end 58 is pivotable relative to the base 22 by a pin joint. The boom 26 further includes a boom sheave 66 coupled to the second end 62 of the boom 26. The boom sheave 66 guides the ropes 54 over the second end 62. The ropes 54 are coupled to the bucket 38 by a bail assembly 70, which is pivotably coupled to the bucket 38 in the illustrated embodiment. The bucket 38 moves toward the boom sheave 66 as the rope is reeled in by the hoist drum 50 and the bucket moves away from the boom sheave 66 as the ropes 54 are paid out. In some embodiments, the bail assembly 70 includes an equalizer for maintaining the ropes 54 in an orientation that is generally tangent to the boom sheave 66.

The boom 26 also includes a shipper shaft assembly 74 and saddle blocks 78. The shipper shaft assembly 74 extends through the boom 26 and is positioned between the first end 58 and the second end 62 of the boom 26. In the illustrated embodiment, the shipper shaft assembly 74 is rotatable about an axis defined by the shipper shaft assembly 74 and oriented transverse to a longitudinal axis of the boom 26. The shipper shaft assembly 74 includes crowd pinions 82. The saddle blocks 78 are rotatably coupled to the boom 26 by the shipper shaft assembly 74.

Figure 2:
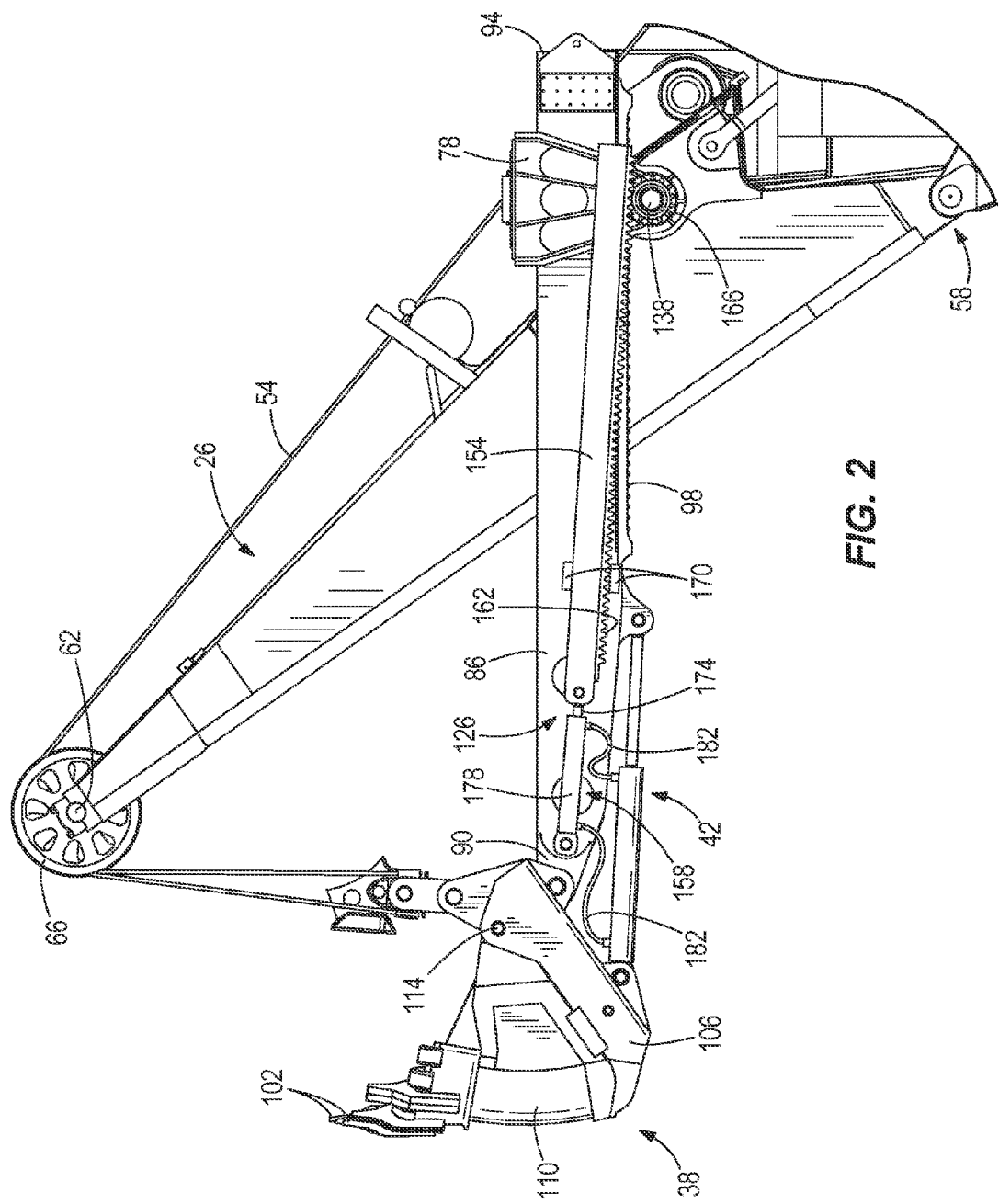
FIG. 2 is a side view of a handle, a bucket, and a pivot mechanism, with the bucket in a first position.

Referring to FIG. 1, the handle 34 includes a pair of arms 86 and defines a first end 90 and a second end 94. The first end 90 is pivotably coupled to the bucket 38. The second end 94 is movably received in the saddle blocks 78. In the illustrated embodiment, the handle arms 86 are positioned on either side of the boom 26 and movably pass through each saddle block 78 such that the handle 34 is capable of rotational and translational movement relative to the boom 26. Stated another way, the handle 34 is linearly extendable relative to the saddle blocks 78 and is rotatable about the shipper shaft assembly 74. Hoisting the ropes 54 rotates the handle 34 and saddle blocks 78 about the shipper shaft assembly 74 relative to the boom 26. The handle 34 is also linearly extendable relative to the saddle blocks 78. As shown in FIG. 2, in the illustrated embodiment, each arm 86 includes a rack 98 (FIG. 2) for engaging the crowd pinions 82 (FIG. 1) of the shipper shaft assembly 74, forming a rack-and-pinion coupling between the handle 34 and the boom 26. Rotation of the crowd pinion 82 moves the rack 98 along the pinion 82, facilitating translational movement of the handle 34 relative to the boom 26.

The bucket 38 is used to excavate a desired work area, collect material, and transfer the collected material to a desired location (e.g., a material handling vehicle). The bucket 38 may include teeth 102 for engaging a bank of material. Each pivot actuator 42 is coupled between the bucket 38 and the handle 34 and actively controls the pitch of the bucket 38 (i.e., the angle of the bucket 38 relative to the handle 34) by rotating the bucket 38 about the handle first end 90. In the illustrated embodiment, the pivot actuators 42 are hydraulic cylinders.

Figure 5:
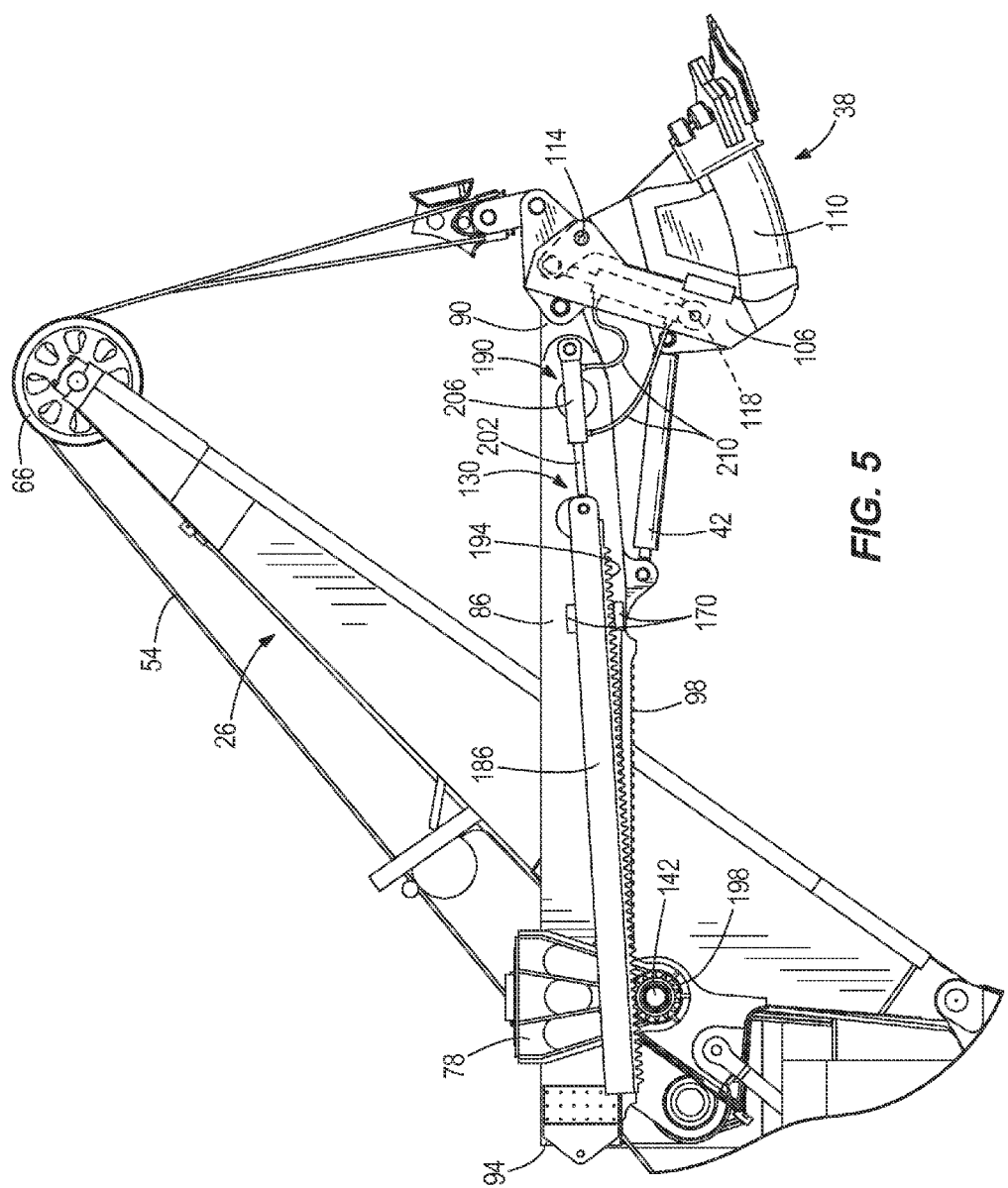
FIG. 5 is a side view of the handle, the bucket, and a clam mechanism, with the bucket in a closed state.

In the illustrated embodiment, the bucket 38 is a clamshell-type bucket 38 having a first portion or rear wall 106, a second portion or main body 110 movable relative to the rear wall 106 about a pin 114, and a clam actuator 118 (FIG. 5). As used herein, the term "clam actuator" refers to a mechanism for moving portions of the attachment 38 relative to one another, as distinguished from an actuator for moving the attachment 38 relative to the handle 34 or another component of the shovel 10. Operation of the clam actuator 118 moves the body 110 about the pin 114 relative to the rear wall 106 in order to open and close the bucket 38. In other embodiments, the shovel 10 may include other types of attachments, buckets, or dippers. Also, in other embodiments, the clam actuator 118 may move the rear wall 106 relative to the body 110.

Figure 6:
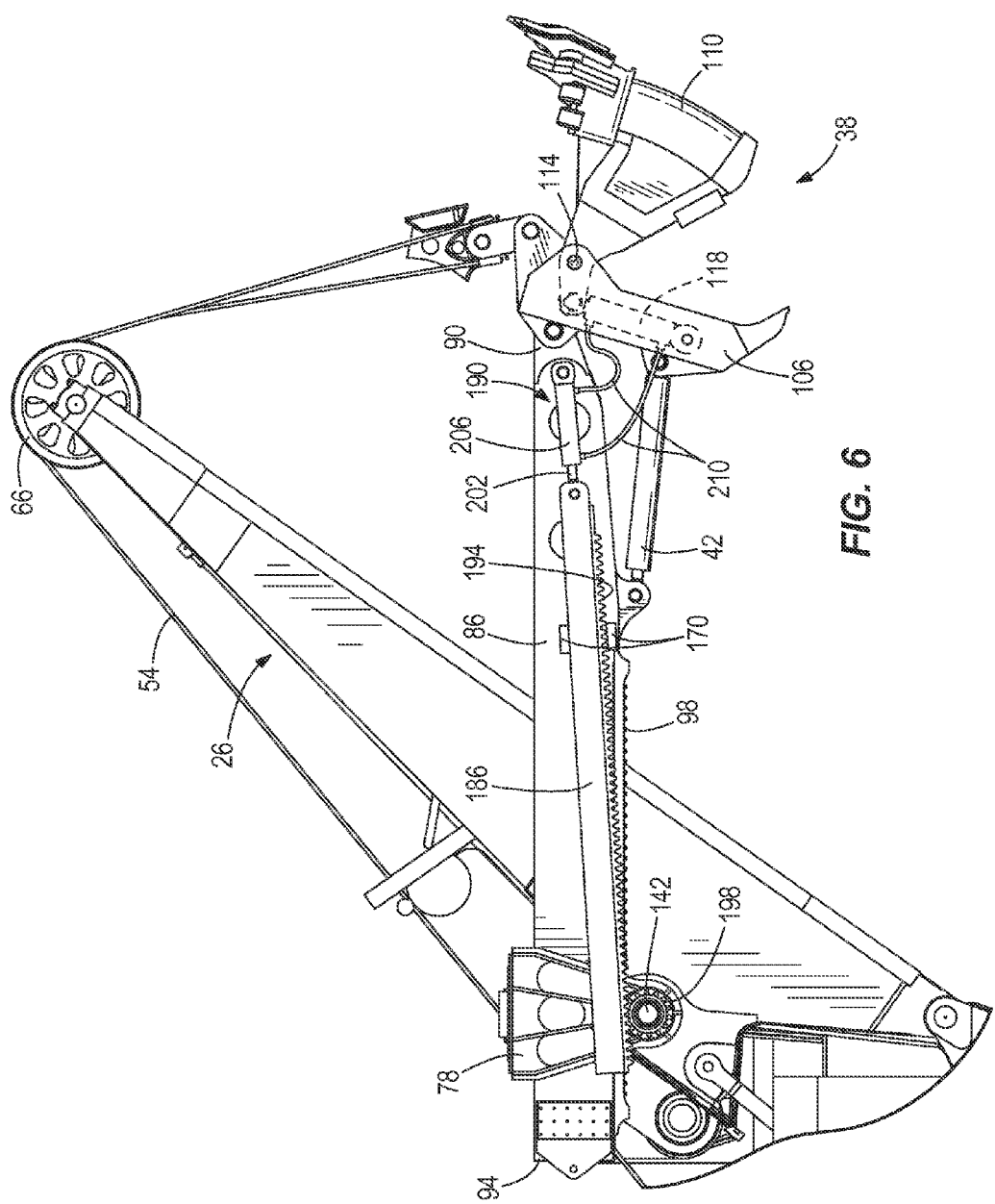
FIG. 6 is a side view of the handle, the bucket, and the clam mechanism of FIG. 5, with the bucket in an opened state.

The drive mechanism 46 is controlled by the shipper shaft assembly 74 and includes a pivot mechanism 126 (FIGS. 2 and 3) and a clam mechanism 130 (FIGS. 5 and 6). FIG. 4 shows a cross-section of the shipper shaft assembly 74, which further includes crowd shafts 134, a pivot shaft 138, and a clam shaft 142. Each crowd shaft 134 includes crowd pinions 82 for engaging the handle rack 98. A crowd motor 146 drives the crowd shafts 134 via a gear train 136, and rotation of the crowd shafts 134 facilitates translational movement of the handle 34 relative to the boom 26. In the illustrated embodiment, each crowd shaft 134 is hollow and the pivot shaft 138 is mounted concentrically within a hollow portion of one of the crowd shafts 134, while the clam shaft 142 is mounted concentrically within a hollow portion of the other of the crowd shafts 134. In other embodiments, each of the crowd shafts 134, the pivot shaft 138, and the clam shaft 142 may be rotatable about separate axes. As shown in FIG. 4, the pivot shaft 138 is coupled to a gear driven by a pivot motor 148, and the clam shaft 142 is coupled to a gear driven by a clam motor 150. Each shaft 138, 142 is driven by a separate gear train (not shown). In other embodiments, the pivot shaft 138 and the clam shaft 142 can be driven by another mechanism, such as a belt or chain, coupled to the pivot motor 148 and clam motor 150, respectively. The operation of the pivot mechanism 126 and the clam mechanism 130 are described in further detail below.

Figure 3:
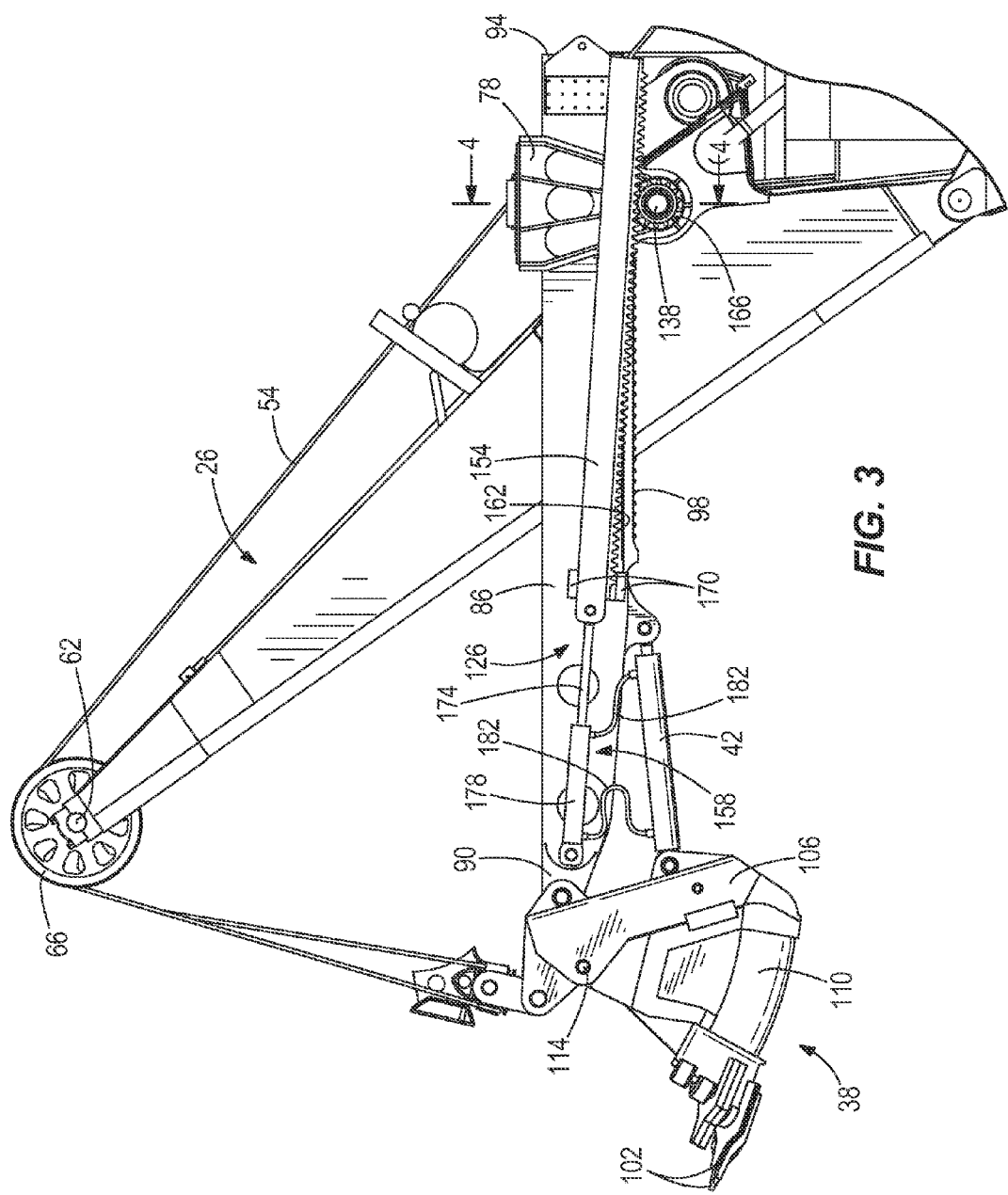
FIG. 3 is a side view of the handle, the bucket, and the pivot mechanism of FIG. 2, with the bucket in a second position.
Figure 4:
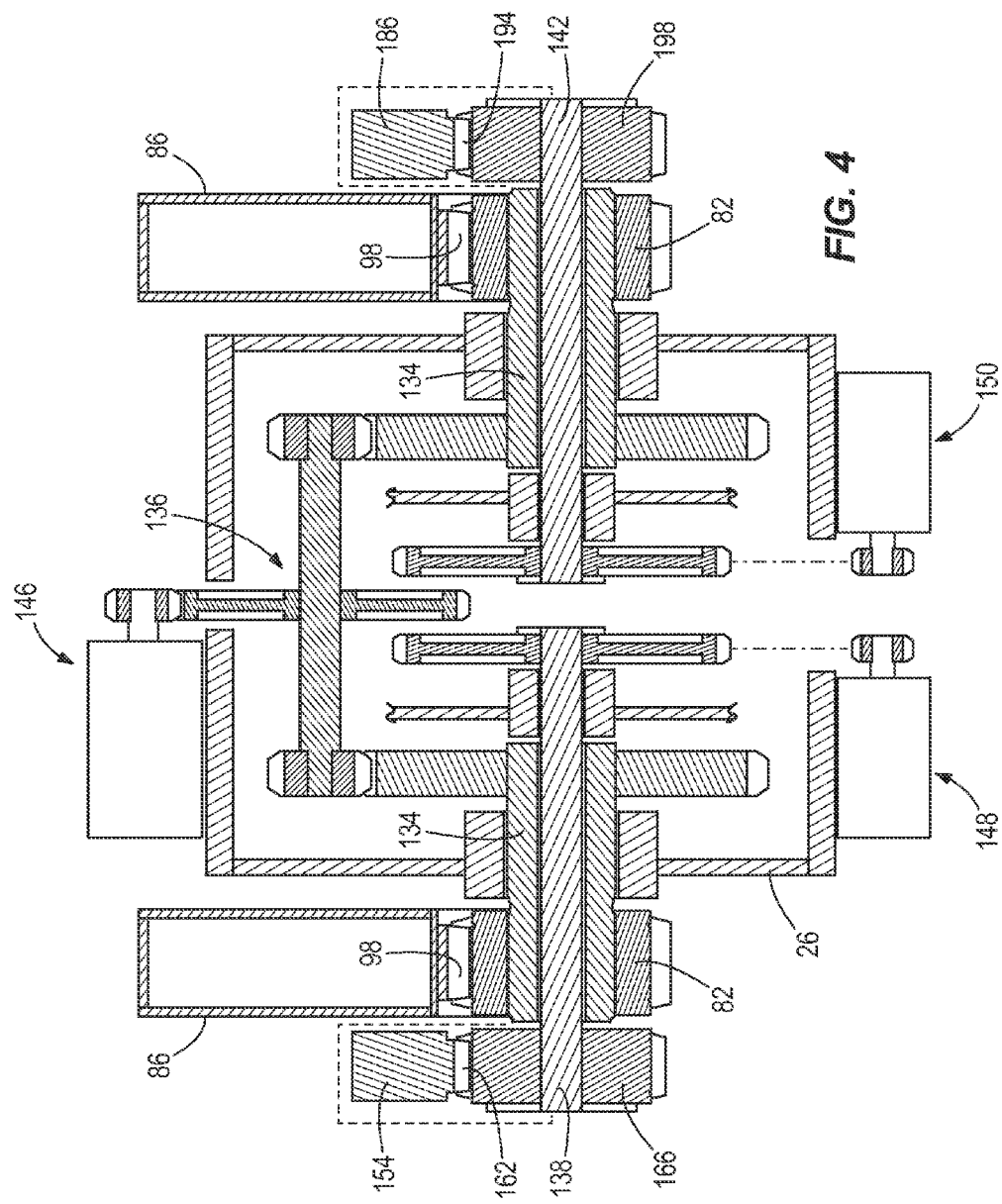
FIG. 4 is a section view of the handle and pivot mechanism of FIG. 3 viewed along section 4-4.

Referring to FIGS. 2 and 3, the pivot mechanism 126 includes a first drive link 154 and a first fluid pump 158. The first drive link 154 includes a rack 162 engaging a pivot pinion 166 supported on the pivot shaft 138 to form a rack-and-pinion coupling. In one embodiment, the rack-and-pinion coupling is similar to the rack-and-pinion coupling between the handle 34 and the crowd pinion 82 described above. The first drive link 154 is slidable relative to the handle 34. In the illustrated embodiment, the first drive link 154 is maintained in engagement with the pivot pinion 166 by a secondary saddle block 168 (FIG. 1). In addition, the first drive link 154 is positioned between guides or projections 170 to secure the first drive link 154 against rotation and to guide movement of the first drive link 154 relative to the handle 34.

The first fluid pump 158 is coupled between the first drive link 154 and the handle 34. In the embodiment of FIGS. 2 and 3, the first fluid pump 158 includes a rod 174 coupled to a piston (not shown) that is movable within a cylinder 178. The cylinder 178 is in fluid communication with the pivot actuator 42 by fluid lines 182.

Referring to FIGS. 2-4, the pivot pinion 166 is coupled to the pivot shaft 138 (FIG. 4) and driven by the pivot motor 148 (FIG. 4), and the rotation of the pivot pinion 166 moves the first drive link 154 relative to the handle 34. As the first drive link 154 slides relative to the handle 34, the piston moves within the cylinder 178, changing the internal fluid volume of the cylinder 178. The changing volume pumps fluid either into or out of the pivot actuator 42 via the fluid lines 182, causing the pivot actuator 42 to extend or retract, respectively, and thereby pivots the bucket 38 relative to the handle 34. In the illustrated embodiment, the first pump 158 and the pivot actuator 42 are double-acting cylinders.

In the illustrated embodiment, movement of the piston in one direction causes a reciprocal movement of the pivot actuator 42. For example, when the first fluid pump 158 is compressed (FIG. 2), the pivot actuator 42 extends, pivoting the bucket 38 upwardly about the first end 90 of the handle 34 (clockwise as shown in FIG. 2). When the first fluid pump 158 is extended (FIG. 3), the pivot actuator 42 refracts, pivoting the bucket 38 downwardly about the first end 90 of the handle 34 (counter-clockwise as shown in FIG. 3).

As shown in FIGS. 5 and 6, the clam mechanism 130 includes a second drive link 186 and a second fluid pump 190. The second drive link 186 includes a rack 194 engaging a clam pinion 198 (FIG. 4) supported on the clam shaft 142 to form a rack and pinion coupling. The operation of the second drive link 186 relative to the clam pinion 198 is substantially similar to the operation of the first drive link 154 and the pivot pinion 166 described above with respect to FIGS. 2 and 3. The second drive link 186 is slidable relative to the handle 34. In the illustrated embodiment, the second drive link 186 is positioned between guides or projections 170 to secure the second drive link 186 against rotation and to guide movement of the second drive link 186 relative to the handle 34. The second fluid pump 190 is coupled between the second drive link 186 and the handle 34. In the embodiment of FIGS. 5 and 6, the second fluid pump 190 includes a rod 202 coupled to a piston (not shown) that is movable within a cylinder 206. The cylinder 206 is in fluid communication with the clam actuator 118 by fluid lines 210.

The clam pinion 198 is coupled to the clam shaft 142 (FIG. 4) and driven by the clam motor 150 (FIG. 4), and rotation of the clam pinion 198 moves the second drive link 186 relative to the handle 34. As the second drive link 186 slides relative to the handle 34, the piston moves within the cylinder 206, changing the internal volume of the cylinder 206. In the illustrated embodiment, the changing volume pumps fluid either into or out of the clam actuator 118 via the fluid lines 210, causing the clam actuator 118 to retract or extend, respectively, and thereby pivot the body 110 of the bucket 38 about the pin 114 relative to the rear wall 106. In the illustrated embodiment, the second pump 190 and the clam actuator 118 are double-acting cylinders.

In the illustrated embodiment, when the second fluid pump 190 is extended (FIG. 5), the clam actuator 118 extends, drawing the main body 110 toward the rear wall 106. When the second fluid pump 190 is compressed (FIG. 6), the clam actuator 118 refracts, pivoting the main body 110 away from the rear wall 106.

The pivot mechanism 126 and clam mechanism 130 permit a user to actuate the bucket 38 coupled to a translating handle 34 without requiring conduit for conveying hydraulic fluid from the base 22 to the bucket 38. That is, any required pressurized fluid is provided on the handle 34 proximate the attachment. The pivot mechanism 126 and clam mechanism 130 also reduce the need for pumping hydraulic fluid on the machine 10 and permit the machinery and control components for the pivot and clam operations to be supported on the boom 26 instead of on the base 22.

Referring again to FIG. 4, the nested shaft and gear configuration permits multiple rack-and-pinion connections within a relatively compact space. In the illustrated embodiment, the crowd, pivot, and clam operations are controlled by separate motors 146, 148, 150. These motors can be electrically or hydraulically driven, and may be supported on the boom 26. In other embodiments, these operations can be driven by one or more motors using one or more clutches and brakes to selectively couple the crowd pinion 82, the pivot pinion 166, and the clam pinion 198 to the motor(s). In still other embodiments, the pivot pinion 166 has a different size than the crowd pinion 82, causing the bucket 38 to curl inwardly when the bucket 38 is hoisted. In other embodiments, an electronic controller actuates the bucket 38 to curl as it is hoisted.

In the illustrated embodiment, the pivot mechanism 126 is positioned on one side of the boom 26 and the handle 34, while the clam mechanism 130 is positioned on the other side. In other embodiments, the pivot mechanism 126 and clam mechanism 130 each may include linkages on both sides of the boom 26 or may be positioned between sides of the boom 26.

Figure 7:
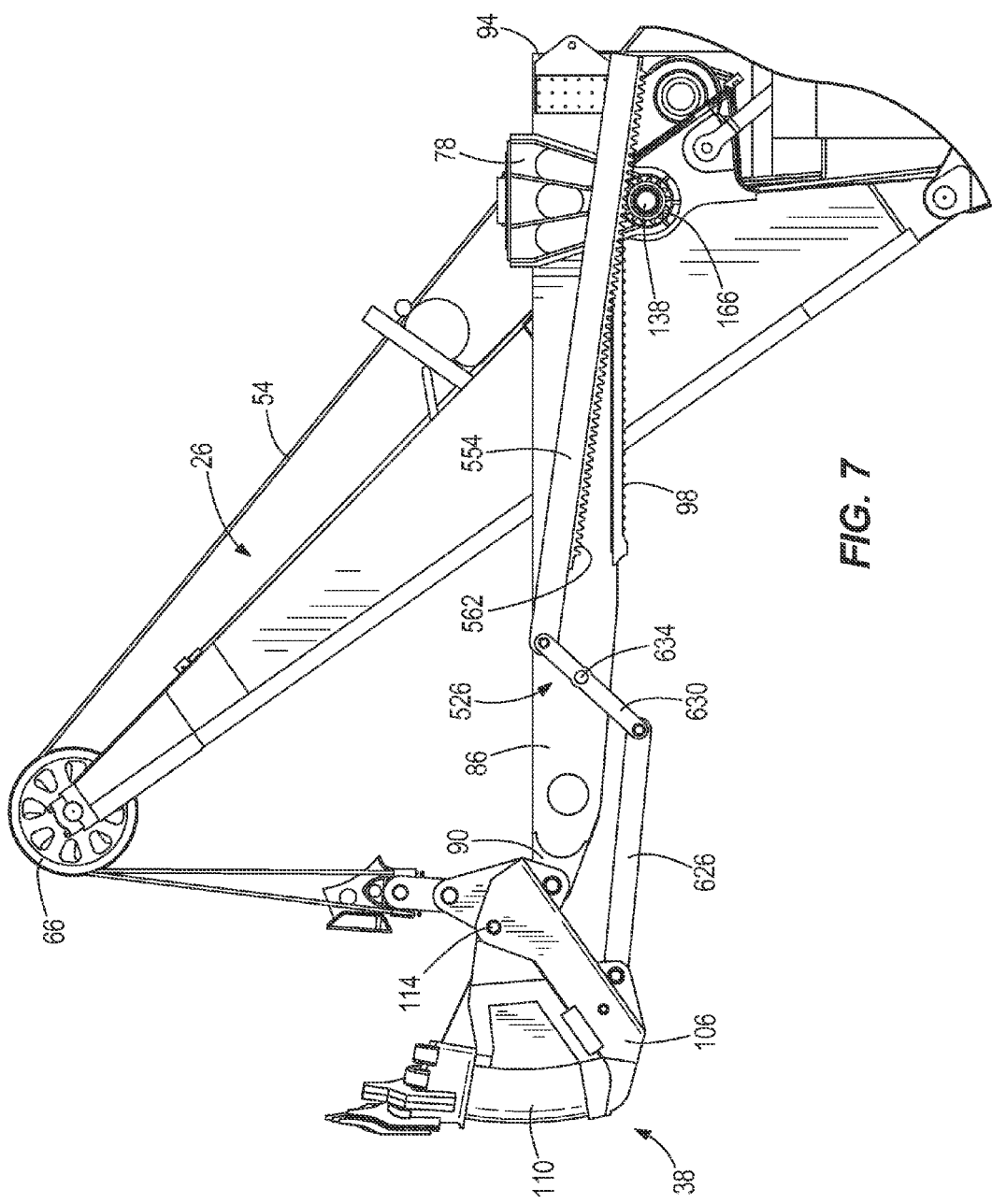
FIG. 7 is a side view of a handle, a bucket, and a pivot mechanism according to another embodiment, with the bucket in a first position.
Figure 8:
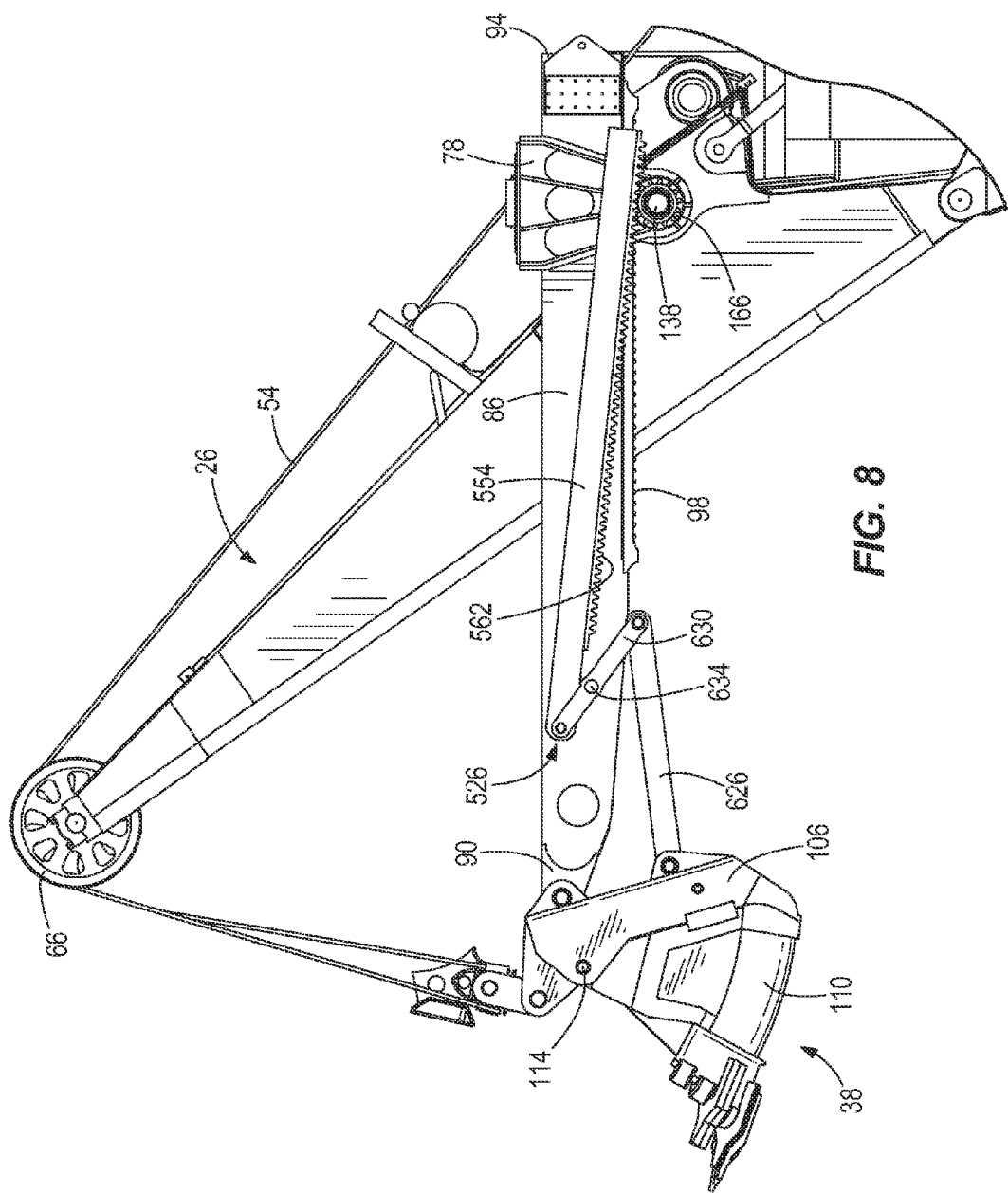
FIG. 8 is a side view of the handle, the bucket, and the pivot mechanism of FIG. 7, with the bucket in a second position.

FIGS. 7 and 8 illustrate another embodiment of a pivot mechanism 526 and a clam mechanism 530. In general, the pivot mechanism 526 and the clam mechanism 530 are similar to the pivot mechanism 126 and clam mechanism 130 described above with respect to FIGS. 2-3 and 5-6, and similar parts are indicated by similar reference numbers, plus 400.

As shown in FIGS. 7 and 8, the pivot mechanism 526 includes a first drive link 554, a first follower link 626, and a first coupler link 630. The first drive link 554 includes a rack 562 engaging the pivot pinion 166 to form a rack-and-pinion coupling. The first drive link 554 is slidable relative to the handle 34, and an end of the first drive link 554 is pivotably coupled to the first coupler link 630. The first follower link 626 is pivotably coupled to the bucket 38 at one end and is pivotably coupled to the first coupler link 630 at another end. The first coupler link 630 is pivotably coupled to the handle 34, such as by a pin 634.

The first drive link 554, the first follower link 626, and the first coupler link 630 form a "Z-bar" linkage such that an input on the first drive link 554 is transmitted through the first coupler link 630 and creates an output on the first follower link 626. As the pivot motor 148 drives the pivot pinion 166 to rotate, the first drive link 554 slides relative to the handle 34. The first coupler link 630 then rotates about the pin 634, thereby driving the first follower link 626. In other embodiments, the pivot mechanism 526 may use other linkage configurations.

The first follower link 626 transmits a force on the bucket 38 and pivots the bucket 38 about the first end 90 of the handle 34. For example, when the first drive link 554 is retracted or moved away from the bucket 38 (FIG. 7), the first follower link 626 extends, pivoting the bucket 38 upwardly (clockwise in FIG. 7). Alternatively, when the first drive link 554 is extended or moved toward the bucket 38, the first follower link 626 retracts, pivoting the bucket 38 downwardly about the handle 34 (counter-clockwise in FIG. 8).

Figure 9:
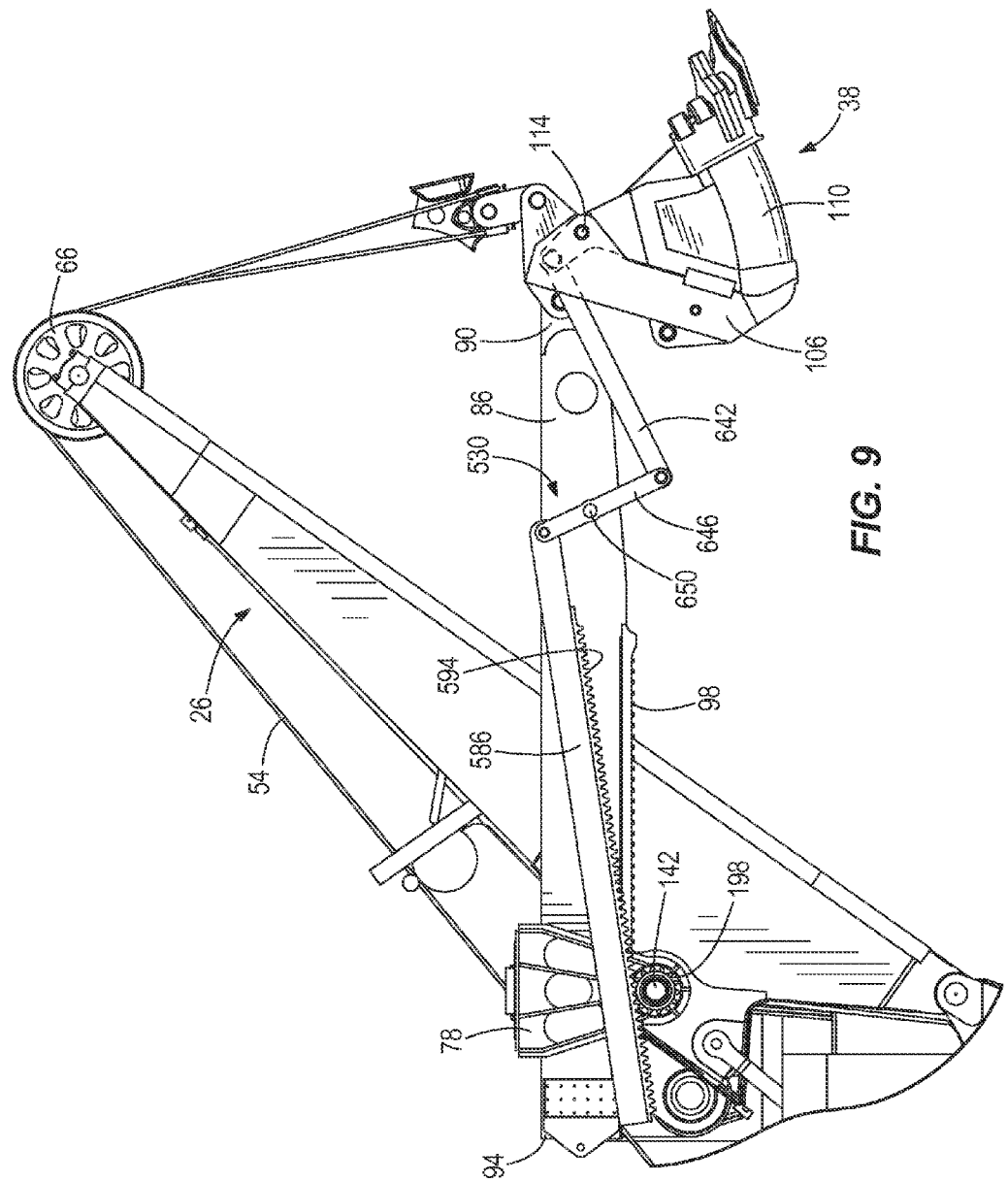
FIG. 9 is a side view of a handle, a bucket, and a clam mechanism according to another embodiment, with the bucket in a closed state.
Figure 10:
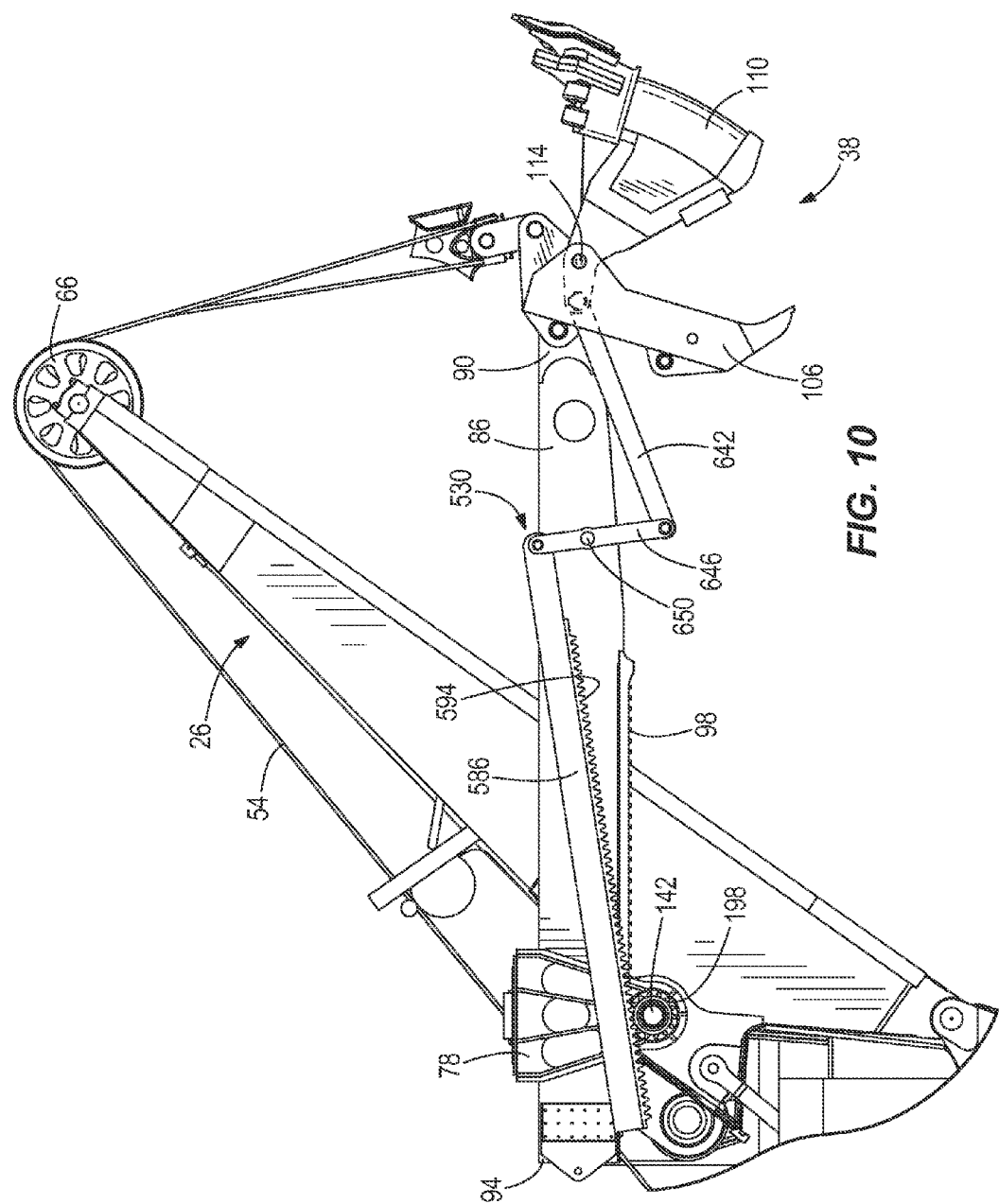
FIG. 10 is a side view of the handle, the bucket, and the clam mechanism of FIG. 9, with the bucket in an opened state.

As shown in FIGS. 9 and 10, the clam mechanism 530 includes a second drive link 586, a second follower link 642, and a second coupler link 646. The second drive link 586 includes a rack 594 engaging the clam pinion 198 to form a rack-and-pinion coupling. The second drive link 586 is slidable relative to the handle 34, and an end of the second drive link 586 is pivotably coupled to the second coupler link 646. The second follower link 642 is pivotably coupled to the body 110 of the bucket 38 at one end and is pivotably coupled to the second coupler link 646 at another end. The second coupler link 646 is pivotably coupled to the handle 34, such as by a pin 650.

The second drive link 586, the second follower link 642, and the second coupler link 646 form a "Z-bar" linkage such that an input on the second drive link 586 is transmitted through the second coupler link 646 and creates an output from the second follower link 642. As the clam motor 150 drives the clam pinion 198 to rotate, the second drive link 586 slides relative to the handle 34. The second coupler link 646 then rotates about the pin 650, thereby driving the second follower link 642. The second follower link 642 transmits a force on the body 110 and pivots the body 110 about the pin 114 relative to the rear wall 106, thereby opening and closing the bucket 38. In the illustrated embodiment, when the second drive link 586 is extended (FIG. 9), the second follower link 642 retracts and draws the main body 110 toward the rear wall 106. Alternatively, when the second drive link 586 is retracted along the clam pinion 198, the second follower link 642 is extended, thereby pivoting the main body 110 away from the rear wall 106.

In other embodiments, the pivot mechanism and clam mechanism may be a combination of each embodiment described above. For example, the pivot mechanism 526 of FIGS. 7 and 8 could be implemented with the clam mechanism 130 of FIGS. 5 and 6, or the pivot mechanism 126 of FIGS. 2 and 3 could be implemented with the clam mechanism 530 of FIGS. 9 and 10. In still other embodiments, a shovel may include only a pivot mechanism as described above and may include a different type of clam mechanism. Alternatively, a shovel may include only a clam mechanism as described above and may include a different type of pivot mechanism.

Furthermore, it is understood that the configurations of the pivot mechanism and clam mechanism could be altered so that the bucket is actuated when the drive links are moved in an opposite direction to the movement shown in illustrated embodiments. For example, the fluid lines 182, 210 could be switched, the attachment points of the actuators 42, 118 could be altered, and/or the attachment points of the follower links 626, 642 could be altered, so that the bucket actuators are operated when the drive links move in an opposite direction to the movement shown in the illustrated embodiments. The relative sizes of the actuators and the links could also be altered to achieve a desired relational movement.

Thus, the invention may provide, among other things, a drive mechanism for actuating a mining attachment. Although the invention has been described in detail with reference to certain independent embodiments, variations and modifications exist within the scope and spirit of one or more independent aspects of the invention as described. Various features and advantages of the invention are set forth in the following claims.

The invention claimed is:

1. An industrial machine comprising:
   a boom having a first end and a second end;
   a hoist cable including a portion extending over the second end of the boom;
   an elongated member movably coupled to the boom and including a first end and a second end;
   an attachment coupled to the first end of the elongated member and coupled to the portion of the hoist cable;
   a drive link movably coupled to the boom and movable relative to the elongated member; and
   a follower link including a first end pivotably coupled to the drive link and a second end coupled to the attachment such that movement of the drive link drives actuation of the attachment.

2. The industrial machine of claim 1, wherein the boom includes a transverse shaft supporting a pinion gear, wherein the drive link includes a rack for engaging the pinion gear such that rotation of the pinion gear moves the drive link.

3. The industrial machine of claim 1, further comprising a coupler link pivotably coupled between the drive link and the follower link and pivotable relative to the elongated member.

4. The industrial machine of claim 1, wherein the attachment is pivotably coupled to the first end of the elongated member and the follower link is coupled to the attachment, actuation of the drive link pivoting the attachment relative to the elongated member about the first end.

5. The industrial machine of claim 1, wherein the attachment includes a first portion and a second portion pivotably coupled to the first portion, wherein the follower link is coupled to the second portion, actuation of the drive link pivoting the second portion relative to the first portion.

6. The industrial machine of claim 1, wherein the boom includes a shaft transverse to the boom and positioned between the first end of the boom and the second end of the boom, the shaft supporting the elongated member for translational and rotational movement, the shaft including a pinion gear, the elongated member including a rack engaging the pinion for moving the elongated member relative to the boom.

7. The industrial machine of claim 1, wherein the drive link is a first drive link and the follower link is a first follower link, the industrial machine further comprising,
   a second drive link movably coupled to the boom and movable relative to the elongated member; and
   a second follower link including a first end pivotably coupled to the second drive link and a second end coupled to the attachment such that actuation of the second drive link actuates the attachment.

8. The industrial machine of claim 7, wherein the attachment includes a first portion and a second portion pivotably coupled to the first portion, the first portion of the attachment being pivotably coupled to the first end of the elongated member, wherein actuation of the first drive link pivots the second portion relative to the first portion, and operation of the second drive link pivots the attachment relative to the elongated member about the first end.

9. A digging assembly for a rope shovel including a boom and a hoist rope, the boom having a first end and a second end, the hoist rope extending over the second end of the boom, the digging assembly comprising:
   a shaft positioned between the first end and the second end of the boom and transverse to the boom, the shaft including at least one pinion gear;
   an elongated member supported for movement relative to the boom, the elongated member including a first end and a second end;
   an attachment coupled to the first end of the elongated member, the attachment configured to be coupled to the hoist rope;
   a drive link including a rack engaging the pinion gear of the transverse shaft such that rotation of the pinion gear moves the drive link and actuates the attachment; and
   a coupler link and a follower link, the coupler link pivotably coupled between the drive link and the follower link, the follower link including a first end coupled to the coupler link and a second end coupled to the attachment,
   wherein movement of the drive link drives the follower link to actuate the attachment.

10. The digging assembly of claim 9, further comprising a fluid cylinder and piston coupled to the drive link, wherein movement of the drive link moves the piston relative to the cylinder to pump fluid out of the cylinder.

11. The digging assembly of claim 10, further comprising a pivot actuator coupled between the attachment and the elongated member, wherein movement of the piston pumps fluid into the pivot actuator to move at least a portion of the attachment relative to the first end of the elongated member.

12. The digging assembly of claim 11, wherein the attachment includes a first portion and a second portion pivotably coupled to the first portion, and the digging assembly further comprising a clam actuator coupled between the first portion and the second portion, wherein movement of the piston pumps fluid into the clam actuator to move the second portion relative to the first portion.

13. The digging assembly of claim 10, wherein the attachment includes a first portion and a second portion pivotably coupled to the first portion, and the digging assembly further comprising a clam actuator coupled between the first portion and the second portion, wherein movement of the piston pumps fluid into the clam actuator to move the second portion relative to the first portion.

14. The digging assembly of claim 9, wherein the attachment is pivotably coupled to the first end of the elongated member, and wherein movement of the follower link moves at least a portion of the attachment relative to the first end of the elongated member.

15. The digging assembly of claim 14, wherein the attachment includes a first portion and a second portion pivotably coupled to the first portion, wherein the follower link is coupled to the second portion, and actuation of the drive link pivots the second portion relative to the first portion.

16. The digging assembly of claim 9, wherein the attachment includes a first portion and a second portion pivotably coupled to the first portion, wherein the follower link is coupled to the second portion, and actuation of the drive link pivots the second portion relative to the first portion.

17. An industrial machine comprising:
   a boom having a first end and a second end;
   an elongated member movably coupled to the boom and including a first end and a second end;
   an attachment coupled to the first end of the elongated member;
   a drive link movably coupled to the boom and movable relative to the elongated member; and
   a follower link including a first end pivotably coupled to the drive link and a second end coupled to the attachment such that movement of the drive link drives actuation of the attachment,
   wherein the boom includes a transverse shaft supporting a pinion gear,
   wherein the drive link includes a rack for engaging the pinion gear such that rotation of the pinion gear moves the drive link.

18. The industrial machine of claim 17, further comprising a coupler link pivotably coupled between the drive link and the follower link and pivotable relative to the elongated member.

19. The industrial machine of claim 17, wherein the attachment is pivotably coupled to the first end of the elongated member and the follower link is coupled to the attachment, actuation of the drive link pivoting the attachment relative to the elongated member about the first end.

20. The industrial machine of claim 17, wherein the attachment includes a first portion and a second portion pivotably coupled to the first portion, wherein the follower link is coupled to the second portion, actuation of the drive link pivoting the second portion relative to the first portion.

21. The industrial machine of claim 17, wherein the transverse shaft is positioned between the first end of the boom and the second end of the boom, the shaft supporting the elongated member for translational and rotational movement, wherein the elongated member includes a rack.

22. The industrial machine of claim 17, wherein the drive link is a first drive link and the follower link is a first follower link, the industrial machine further comprising,
   a second drive link movably coupled to the boom and movable relative to the elongated member; and
   a second follower link including a first end pivotably coupled to the second drive link and a second end coupled to the attachment such that actuation of the second drive link actuates the attachment.

23. The industrial machine of claim 22, wherein the attachment includes a first portion and a second portion pivotably coupled to the first portion, the first portion of the attachment being pivotably coupled to the first end of the elongated member, wherein actuation of the first drive link pivots the second portion relative to the first portion, and operation of the second drive link pivots the attachment relative to the elongated member about the first end.

* * * * *